United States Patent [19]

Henry

[11] 4,152,731
[45] May 1, 1979

[54] READ CIRCUIT FOR DISTINGUISHING FALSE PEAKS IN AN ALTERNATING CURRENT PLAYBACK SIGNAL

[75] Inventor: Paul M. Henry, Chandler, Ariz.

[73] Assignee: Motorola, Inc., Schaumburg, Ill.

[21] Appl. No.: 862,467

[22] Filed: Dec. 20, 1977

[51] Int. Cl.$^2$ ............................................... G11B 5/09
[52] U.S. Cl. ..................................................... 360/43
[58] Field of Search ................................... 360/43, 51

[56] References Cited

U.S. PATENT DOCUMENTS

| 3,404,391 | 10/1968 | Chur ........................................ 360/43 |
| 3,597,751 | 8/1971 | Heidecker et al. ..................... 360/43 |
| 3,623,040 | 11/1971 | Erikson et al. ......................... 360/43 |

*Primary Examiner*—Vincent P. Canney
*Attorney, Agent, or Firm*—Walter W. Nielsen

[57] ABSTRACT

An improved read circuit for use with a magnetic read transducer in a magnetic recording system in which the read transducer generates an alternating current playback signal having alternating positive and negative peaks. The read circuit comprises an active differentiator responsive to the playback signal for producing a differentiated signal having positive and negative values with zero crossings in time coincidence with the positive and negative peaks of the playback signal, and a differential comparator for generating an intermediate playback signal having a first value when the differentiated signal is positive and having a second value when the differentiated signal is negative and for generating the complement of the intermediate signal. The read circuit comprises additional logic circuitry responsive to the intermediate playback signal and its complement for generating an output signal having first and second values corresponding to the positive and negative peaks, respectively, of the playback signal and capable of distinguishing false peaks or shoulders in the playback signal. The logic circuitry distinguishes false peaks by requiring that the intermediate playback signal remain in a state which is different from its immediately previous state for at least a predetermined time, such time being of duration sufficient to eliminate false peaks, which typically produce fairly rapid transitions in the level of the intermediate playback signal. The logic circuit design minimizes problems of peak shift.

18 Claims, 3 Drawing Figures

READ CIRCUIT FOR DISTINGUISHING FALSE PEAKS IN AN ALTERNATING CURRENT PLAYBACK SIGNAL

BACKGROUND OF THE INVENTION

The invention relates generally to apparatus for reading and processing signals from a magnetic recording medium and, more particularly, to an improved read circuit which avoids problems associated with differentiated droop and peak shift.

In contemporary data processing systems data is stored on magnetic tape or magnetic discs for retrieval and use at a later time. The data is recorded on one or more tracks of the magnetic medium in the form of a sequence of ones and zeros according to any one of several commonly used codes, such as the frequency modulation (FM) code, the modified frequency modulation (MFM) code, and the modified MFM ($M^2FM$) code. The last mentioned code has been found to be useful at high packing densities, where the data bits are closely compacted, in order to avoid peak shift problems.

Peak shift is a phenomenon which occurs primarily at high recording densities, since under these conditions the read head is also detecting the magnetic transitions immediately preceding and following the particular magnetic transitions which it is currently reading. If one of the adjacent transitions is further away from the one currently being read, the amplitude of the detected signal will not be reduced as much as by the more immediately adjacent transition, and this asymmetry causes the peak of the detection signal corresponding to the transition being read to be shifted from its true position. The resulting peak shift has a deleterious effect upon the detection circuitry of the magnetic playback apparatus, since clock bits may be confused with data bits and the timing circuitry of the magnetic recording apparatus may be thrown out of synchronization.

As mentioned above, the $M^2FM$ code minimizes the problems associated with peak shift. However, it also introduces a problem of its own by causing the detection of false peaks or "shoulders". The nature of the alternating current signal detected by a read head transducing information bits in the $M^2FM$ code is such that a "shoulder" frequently occurs, which "shoulder" does not represent a true peak. When the playback signal is differentiated, the shoulder may be interpreted as a peak, and when the differentiated signal is further processed in the read circuit, the output of the read circuit may indicate a false bit. It is important, of course, that the read circuit be designed so as to differentiate between true bits and false bits to preserve the integrity of the recorded information.

A known prior art magnetic read circuit is described in U.S. Pat. No. 4,012,785, in which circuitry is provided for detecting and eliminating false peaks from the playback signal. However, the read circuitry described in the aforementioned patent separately and independently processes the positive and negative peaks in the playback signal. This increases the likelihood of asymmetry in the read back system, since a greater or lesser amount of delay may be introduced in one branch of the read back circuit than in the other. Consequently, the prior art read back circuit may reintroduce undesirable peak shift into the playback signal, offsetting the advantages of the $M^2FM$ recording code.

SUMMARY OF THE INVENTION

It is therefore an object of the present invention to provide an improved read circuit for detecting recorded information.

It is also an object of the present invention to provide an improved read circuit for use in a magnetic recording system to avoid problems of differentiated droop and peak shift.

It is a further object of the present invention to provide an improved read circuit for use with a magnetic recording system which is capable of distinguishing false peaks in the playback signal and in which the positive and negative values of the playback signal are processed through the same logic circuitry so as to eliminate the introduction of peak shift into the output signal.

These and other objects of the present invention are achieved in accordance with a preferred embodiment of the invention by providing a magnetic read transducer for reading magnetically encoded data from a magnetic medium and generating an alternating current playback signal having positive and negative peaks, an amplifier for amplifying the playback signal, a filter for removing noise from the playback signal, a differentiator for differentiating the filtered signal into a differentiated playback signal, and a comparator for generating an intermediate playback signal having a first level when the differentiated playback signal is positive and a second level when the differentiated playback signal is negative and further generating the complement of the intermediate playback signal. A logic circuit, comprising a bistable storage means, comparing means, first and second delay means, and various logic gates, is reponsive to the intermediate playback signal and its complement to generate ultimately an output signal having pulses representing the true positive and negative peaks of the playback signal detected by the magnetic transducer. The bistable storage means stores the previous level of the intermediate playback signal and is clocked by the output signal pulses. The comparing means is responsive to the current level of the intermediate signal and to the level stored in the bistable storage means, and it generates a comparison signal when its two inputs are different, indicating the detection of either a true or false peak by the magnetic transducer. The first delay means is responsive to the comparison signal and generates an output after a predetermined length of time of duration sufficient to eliminate false peaks. A logic gate is responsive to both the output of the first delay means and to the comparison signal and generates an output if and only if both the delay signal and the comparison signal are present. The output of the logic gate is then input into the second delay means, which generates an output pulse of predetermined width representing the detection of a true peak by the magnetic transducer.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
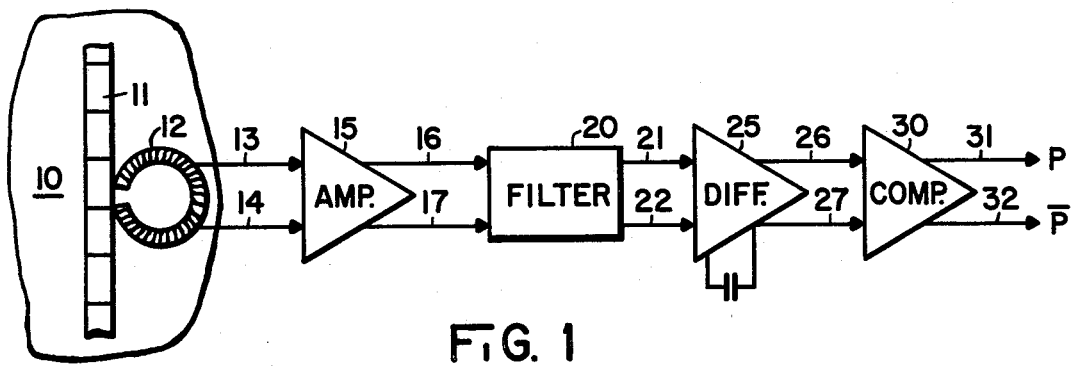
FIG. 1 is a representational block diagram of a portion of a preferred embodiment of the present invention.

FIG. 1 illustrates in block diagram form the wave-shaping portion of the read circuit. The wave-shaping circuitry comprises a magnetic transducing head 12 for reading recorded information from a track 11 of a magnetic medium 10 moving relative to transducing head 12, in a manner well known to those skilled in the art. The alternating current playback signal generated by read head 12 is conducted over lines 13 and 14 to amplifier 15, which amplifies the playback signal. The amplified playback signal is subsequently transmitted over lines 16 and 17 to filter 20, the function of which is to remove noise components from the amplified playback signal. The filtered playback signal is then input over lines 21 and 22 into differentiator 25. Differentiator 25 differentiates the filtered signal, producing a zero-valued signal at each peak, whether true or false, in the playback signal. The differentiated playback signal is then transmitted over lines 26 and 27 to comparator 30.

Comparator 30 generates an intermediate playback signal P over line 31 and its complement $\bar{P}$ over line 32. Intermediate playback signal P has a first level when the differentiated playback signal input into comparator 30 has a positive value and has a second value when the differentiated playback signal has a negative value, with transitions occurring when the differentiated playback signal value is zero. Thus the transitions between levels in the intermediate playback signal P represent the occurrence of peaks, true or false, in the detected playback signal. In the case of false peaks, two relatively fast transitions occur in the intermediate playback signal P. Without proper signal processing, these transitions may be interpreted incorrectly as true signal peaks. The logic circuitry shown in FIG. 2 and described hereinafter eliminates the false peaks from the output signal which is ultimately generated by the read circuit of the present invention.

Figure 2:
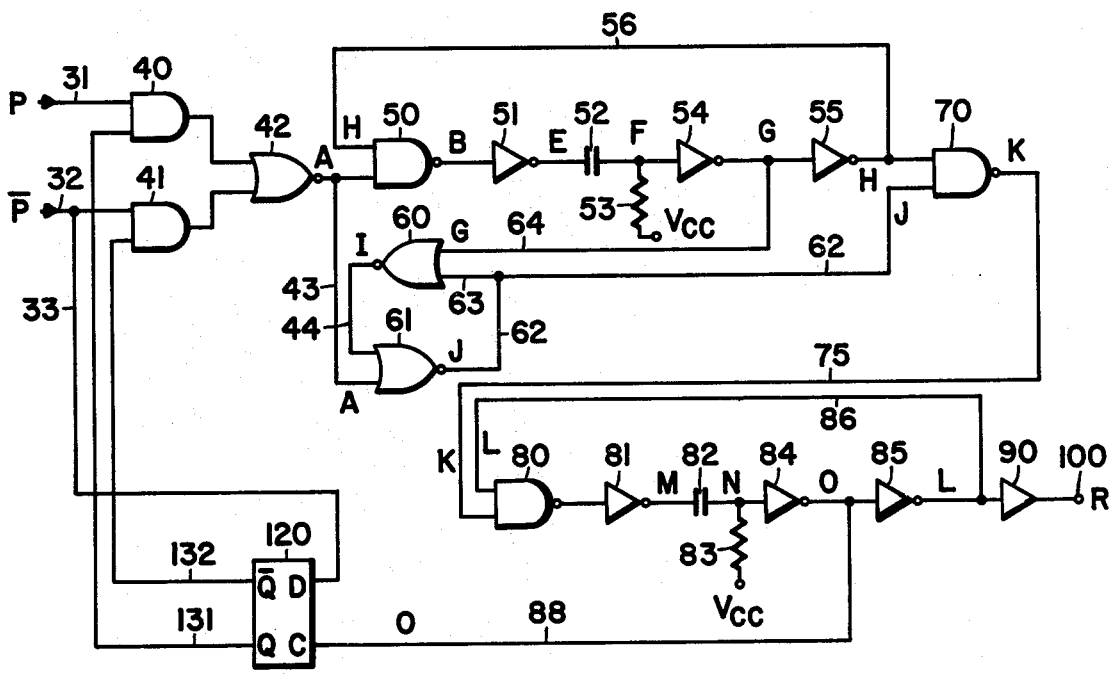
FIG. 2 is a circuit schematic of a portion of a preferred embodiment of the present invention.

FIG. 2 shows a circuit schematic of a portion of a preferred embodiment of the present invention. A comparator comprising AND gates 40 and 41 and NOR gate 42 receives as one set of inputs the intermediate playback signal P and its complement $\bar{P}$ and as a second set of signals the Q and $\bar{Q}$ outputs of a delay flip-flop 120. The P and Q signals are input to AND gate 40 over lines 31 and 131, respectively, while the $\bar{P}$ and $\bar{Q}$ signals are input into AND gate 41 over lines 32 and 132, respectively. The outputs of AND gates 40 and 41 are input into NOR gate 42.

The output of NOR gate 42 is transmitted into a first delay means comprising NAND gate 50, inverter 51, capacitor 52, resistor 53, inverter 54, and inverter 55. The first delay means functions as a monostable multivibrator or "one-shot", which generates a signal having a predetermined level for a predetermined time interval after receiving a triggering impulse. The duration of the time interval is determined by the particular values of capacitor 52, resistor 53, and the source of direct current voltage $V_{CC}$. From FIG. 2 it can be seen that the output of NAND gate 50 is input into inverter 51, whose output is connected to one side of capacitor 52. The other side of capacitor 52 is connected to voltage source $V_{CC}$ by way of resistor 53 as well as to inverter 54, whose output is input into inverter 55. The output of inverter 55 is fed back over line 56 as an input to NAND gate 50. The output of inverter 55 is also transmitted as an input to NAND gate 70.

NAND gate 70 also receives as an input a signal J transmitted over line 62 from a disabling circuit comprising NOR gates 60 and 61, whose function will explained hereinafter. NOR gate 60 receives as one input the output from inverter 54 over line 64 and as a second input the output of NOR gate 61 over lines 62 and 63. The output of NOR gate 60 is transmitted over line 44 as one input into NOR gate 61. The output to NOR gate 42 is transmitted over line 43 as the other input to NOR gate 61. The output of NOR gate 61 is transmitted via line 62 to one input of NAND gate 70.

The output of NAND gate 70 is transmitted over line 75 as one input to NAND gate 80, which forms part of a second delay means. The second delay means comprises NAND gate 80, inverter 81, capacitor 82, resistor 83, inverter 84, and inverter 85. The output of NAND gate 80 is the input to inverter 81, whose output is connected to one side of capacitor 82. The other side of capacitor 82 is connected to direct current voltage $V_{CC}$ through resistor 83 and to the input of inverter 84. The output of inverter 84 forms the input of inverter 85, whose output is fed back over line 86 as the second input to NAND gate 80. The output of inverter 85 is the input to inverter 90, whose output is connected to terminal 100, at which terminal the output signal of the read circuit is transmitted. The output of inverter 84 is also transmitted over line 88 to the clock input C of delay flip-flop 120. The complement of the intermediate playback signal P is transmitted over lines 32 and 33 to the D input of delay flip-flop 120.

AND gates 40 and 41 provide a logical AND function to signals applied to their input leads. In the system disclosed, a binary 1 is represented by a positive signal, and a binary 0 by a zero-valued signal. An AND gate provides a positive-valued output signal if and only if both its inputs are positive-valued, representing binary 1's. Conversely, an AND gate provides a zero-valued output signal, representing a binary 0, when either or both of its inputs are zero-valued, representing binary 0's.

NAND gates 50, 70, and 80 provide a logical NAND function to signals applied to their input leads. A NAND gate provides a zero-valued output signal if and only if both of its input leads are positive-valued, representing binary 1's. Conversely, a NAND gate generates a positive-valued output signal, representing a binary 1, when either or both of its inputs are zero-valued, representing binary 0's.

NOR gates 42, 60 and 61 provide a logical NOR function to signals applied to them. A NOR gate generates a positive-valued output, representing a binary 1, if and only if both its inputs are zero-valued, representing binary 0's. Conversely, a NOR gate generates a zero-valued output signal, representing a binary zero, when either or both of its inputs are positive-valued, representing binary 1's.

Inverters 51, 54, 55, 81, 84, 85, and 90 each provide the logical inversion of a signal applied thereto. An inverter provides a positive output signal representing a binary 1 when the input signal applied thereto is zero-valued representing a binary 0. Conversely, an inverter provides an output signal representing a binary 0 when the input signal represents a binary 1.

Delay flip-flop 120 is a logic circuit operating in either one of two stable states. Delay flip-flop 120 has a D (delay) input and a C (clock) input and Q and $\bar{Q}$ outputs.

Each triggering impulse received at the C input causes the Q output to assume the binary level which was present at the D input immediately preceding the trigger pulse. The $\overline{Q}$ output is the complement of the Q output.

The individual logic circuit components, namely the AND's, NAND's, NOR's, inverters, and delay flip-flop, are all well known to one of ordinary skill in the art and are commercially available.

OPERATION OF THE PREFERRED EMBODIMENT

Figure 3:
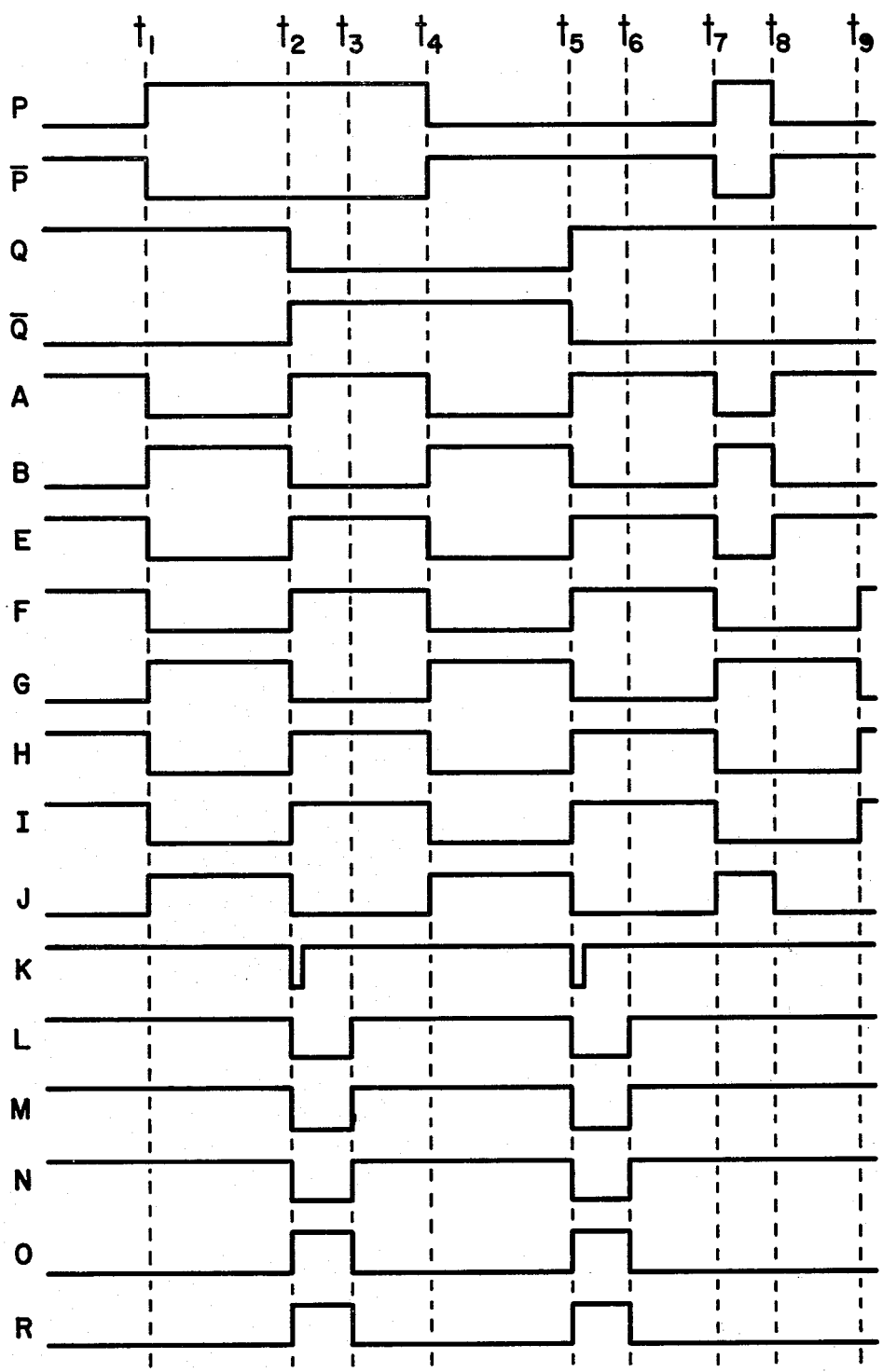
FIG. 3 illustrates various waveforms at different portions of the circuit schematic of FIG. 2.

The operation of the read logic circuitry shown in FIG. 2 will now be described in connection with the waveforms shown in FIG. 3. Let us assume initially at time $t_1$ that the Q and $\overline{Q}$ outputs of delay flip-flop 120 are 1 and 0, respectively. Let us assume further that at time $t_1$ the intermediate playback signal P switches from 0 to 1, and its complement $\overline{P}$ switches from 1 to 0. The switching of intermediate playback signals P and $\overline{P}$ represents the detection of a peak, which could be either a true or false peak. When signal P becomes a 1, AND gate 40 generates a 1, and NOR gate 42 generates a 0 in the form of signal A. Since capacitor 52 is normally in a charged state, signal F is normally high until capacitor 52 is discharged, as at time $t_1$. Therefore, just prior to time $t_1$ signal H is also a binary 1. At time $t_1$ the signal A input to NAND gate 50 is 0, and signal H input is 1, causing the resultant output B to be 1. The binary 1 input to inverter 51 causes its output E to go to 0, thereby discharging capacitor 52 and causing signal F also to go to 0. Signal G correspondingly rises to a binary 1, and signal H falls to a binary 0.

The G input to NOR gate 60 is a binary 1, causing the output I to be a binary 0. Since the A input to NOR gate 61 is also binary 0, its output J is a binary 1. Signal J = 1 conditions NAND gate 70 by providing one binary 1 input thereto. When signal J is a binary 1, this indicates that a peak has just been detected, i.e., intermediate playback signal P has changed from its immediately preceding state Q. In order for NAND gate 70 to generate an output to the second delay circuit, which ultimately generates the desired output pulse R from terminal 100, the intermediate playback signal P must remain in its switched state for a sufficiently long time to assure that it represents a true, rather than a false, peak. This time duration is determined by the time delay of the first delay means, and in particular by the specific values of capacitor 52, resistor 53, and direct current voltage supply $V_{CC}$.

When capacitor 52 has been recharged, as at time $t_2$ signal F goes high, representing a binary 1, and consequently signal H represents a binary 1 input to NAND gate 70. Assuming that no change has occurred in the values of intermediate playback signal P, signal K generated by NAND gate 70 goes to 0 for a brief time. When signal K goes to 0, NAND gate 80 generates a 1, inverter 81 generates a 0, and capacitor 82 discharges. Consequently, signal $\phi$ goes high for the period of time required to recharge capacitor 82. Also, signal R at output terminal 100 goes high for the time during which capacitor 82 is recharged to its high state. According to the preferred embodiment, the time delay of the second delay means is set so as to create a pulse of approximately 200 nanoseconds in width.

When signal $\phi$ goes high at time $t_2$, a positive input is simultaneously received at the C input to delay flip-flop 120, causing the Q output to assume the current value of $\overline{P}$, which is a binary 0. Simultaneously, $\overline{Q}$ becomes a binary 1. At this time the outputs of AND gates 40 and 41 are both 0, and the output A of NOR gate 42 becomes a binary 1. Since both signals A and H are binary 1's, the output B of NAND gate 50 is a binary 0. Consequently, signals E and F are both binary 1's. Single G is a binary 0, and single H remains a binary 1. Since signal A is high, the output J of NOR gate 61 is low, and the output I of NOR gate 60 is high. When signal J goes low, the output K of NAND gate 70 returns to binary 1. Signal L remains low while capacitor 82 is recharging. Consequently, the output of NAND gate 80 is high, and the output M of inverter 81 remains low until capacitor 82 is recharged. Output signal R at terminal 100 remains high during the time required for capacitor 82 to recharge. At time $t_3$ capacitor 82 has been recharged, and signals M, N, and L all go high. Signal R returns to 0 at this time. The pulse in signal R has thus been completely formed at time $t_3$. The leading edge of this pulse, which occurs at time $t_2$, represents the occurrence of a true peak in the playback signal generated by transducer head 12.

At time $t_4$ intermediate playback signal P switches from a 1 to a 0, where it remains for a sufficient period of time (at least until time $t_5$) for it to be categorized as representing the detection of a true peak. At times $t_4$, $t_5$, and $t_6$ the operation of the logic circuitry of FIG. 2 is substantially identical to that described above regarding its operation at times $t_1$, $t_2$, and $t_3$.

The operation of the logic circuitry of FIG. 2 will now be described with regard to the situation where a false peak is detected. This is described with regard to times $t_7$, $t_8$, and $t_9$ of the timing diagram of FIG. 3. At time $t_7$ intermediate playback signal P switches from a 0 to a 1, causing the output A of NOR gate 42 to go to 0. In the manner described before, signal E goes to 0, and the signal H input to NAND gate 70 also goes to 0 for the time required to recharge capacitor 52. When intermediate playback signal P returns to 0 at time $t_8$ the output A of NOR gate 42 goes to 1, causing the output J of NOR gate 61 to go to 0. With signal J at a 0 level, the output K of NAND gate 70 will remain high even when capacitor 52 is recharged and signal H goes high. Thus, the second delay means is never triggered, and no output pulse is produced in signal R when the intermediate playback signal P switches states twice within the predetermined time delay of the first delay means. Thus, any false peaks in the detected playback signal are eliminated from the output signal.

The read circuit of the present invention does not itself reintroduce peak shift into the playback signal, in contrast to prior art read circuits. The series architecture of the present invention treats both negative and positive peaks in the playback signal in identical fashion, so that the rise and fall times and signal delays introduced by the logic circuit components affect both positive and negative peaks equally. Thus, no asymmetry is introduced into the output signal as between positive and negative peaks. It will be noted from FIG. 3 that whenever signals P and $\overline{P}$ change state relative to signals Q and $\overline{Q}$, such as at times $t_1$, $t_4$, and $t_7$ for example, the signals at each point in the logic circuit change in identical fashion. For the detection of both positive and negative peaks, signals A, B, E-$\phi$, and R react identically. And for the detection of a false peak, signals A, B, and E-J react identically to the same signals upon detection of a true positive or negative peak.

It will be apparent to those skilled in the art that the disclosed Read Circuit may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A read circuit for use in an information playback system comprising a read head for reading information from a storage medium and generating an alternating current playback signal having positive and negative peaks, a differentiator for differentiating said playback signal and generating a differentiated signal having positive and negative polarity, and a comparator for generating an intermediate signal having a first level when said differentiated signal has a positive polarity and having a second level when said differentiated signal has a negative polarity, said read circuit generating an output signal having transitions corresponding to said positive and negative peaks of said playback signal, said read circuit comprising:

bistable storage means responsive to said intermediate signal and to said output signal, said bistable storage means changing state for each of said transitions in said output signal, comparing means responsive to said intermediate signal and to the contents of said bistable storage means for generating a comparison signal when the level of said intermediate signal is in a predetermined relationship to the state of said bistable storage means, delay means responsive to said comparison signal for generating a delay signal a predetermined time after receipt of said comparison signal, and logic means responsive to the simultaneous occurrence of said delay signal and said comparison signal for generating one of said transitions in said output signal.

2. The read circuit recited in claim 1, wherein said bistable storage means comprises a delay flip-flop, said delay means comprises a monostable multivibrator, and said logic means comprises a NAND gate.

3. The read circuit recited in claim 1, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

4. A read circuit for use in an information playback system comprising a read head for reading information from a storage medium and generating an alternating current playback signal having positive and negative peaks, a differentiator for differentiating said playback signal and generating a differentiated signal having positive and negative polarity, and a comparator for generating an intermediate signal having a first level when said differentiated signal has a positive polarity and having a second level when said differentiated signal has a negative polarity, said read circuit generating an output signal having transitions corresponding to said positive and negative peaks of said playback signal, said read circuit comprising:

bistable storage means responsive to said intermediate signal and to said output signal, said bistable storage means changing state for each of said transitions in said output signal, comparing means responsive to said intermediate signal and to the contents of said bistable storage means for generating a comparison signal when the level of said intermediate signal is in a predetermined relationship to the state of said bistable storage means, first delay means responsive to said comparison signal for generating a first delay signal a first predetermined amount of time after receipt of said comparison signal, logic means responsive to the simultaneous occurrence of said first delay signal and said comparison signal for generating an enabling signal, and second delay means responsive to said enabling signal for generating one of said transitions in said output signal and after a second predetermined amount of time generating an additional transition in said output signal.

5. The read circuit recited in claim 4, wherein said bistable storage means comprises a delay flip-flop, said first and second delay means comprise monostable multivibrators, and said logic means comprises a NAND gate.

6. The read circuit recited in claim 4, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

7. A read circuit for use in an information playback system comprising a read head for reading information from a storage medium and generating an alternating current playback signal having positive and negative peaks, a differentiator for differentiating said playback signal and generating a differentiated signal having positive and negative polarity, and a comparator for generating an intermediate signal having a first level when said differentiated signal has a positive polarity and a second level when said differentiated signal has a negative polarity, said read circuit generating an output signal having transitions corresponding to said positive and negative peaks of said playback signal, said read circuit comprising:

a delay flip-flop responsive to said intermediate signal and to said output signal, said delay flip-flop changing state for each of said transitions in said output signal, said delay flip-flop having a Q output and a $\overline{Q}$ output, said $\overline{Q}$ output being the complement of said Q output, comparing means comprising first and second AND gates generating first and second logic outputs respectively, said first AND gate being responsive to said intermediate signal P and to the Q output of said delay flip-flop, said second AND gate being responsive to the complement $\overline{P}$ of said intermediate signal and to the complement $\overline{Q}$ output of said delay flip-flop, and a NOR gate responsive to said first and second logic outputs and generating a comparison signal when the level of said intermediate signal P is identical to the Q output of said delay flip-flop or when the level of the complement $\overline{P}$ of said intermediate signal is identical to the $\overline{Q}$ output of said delay flip-flop, first delay means comprising a monostable multivibrator responsive to said comparison signal for generating a delay signal having a predetermined signal level for a first predetermined amount of time after receipt of said comparison signal and causing said delay signal to change to a different signal level following said first predetermined amount of time, first logic means comprising first and second NOR gates generating third and fourth logic outputs respectively, said first NOR gate being responsive to said delay signal and to the output of said second NOR gate, said second NOR gate being responsive to said comparison signal and to the output of said first NOR gate, second logic means comprising a NAND gate responsive to said delay signal and to the output of said second NOR gate for generating an enabling signal when its inputs are in a predetermined state, and second delay means comprising a second monostable multivibrator responsive to said enabling signal for generating one of said transitions in said output signal and for causing said output signal to have an additional transition after a second predetermined amount of time.

8. The read circuit recited in claim 7, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

9. A read circuit for use in a information playback system comprising a read head for reading information from a storage medium and generating an alternating current playback signal having positive and negative peaks, an amplifier for amplifying said playback signal, a filter for eliminating noise components from said playback signal, a differentiator for differentiating said playback signal and generating a differentiated signal having positive and negative polarity, and a comparator for generating an intermediate signal having a first level when said differentiated signal has a positive polarity and having a second level when said differentiated signal has a negative polarity, said read circuit generating an output signal having transitions corresponding to said positive and negative peaks of said playback signal, said read circuit comprising:

bistable storage means responsive to said intermediate signal and to said output signal, said bistable storage means changing state for each of said transitions in said output signal, comparing means responsive to said intermediate signal and to the contents of said bistable storage means for generating a comparison signal when the level of said intermediate signal is in a predetermined relationship to the state of said bistable storage means, delay means responsive to said comparison signal for generating a delay signal a predetermined time after receipt of said comparison signal, and logic means responsive to the simultaneous occurrence of said delay signal and said comparison signal for generating one of said transitions in said output signal.

10. The read circuit recited in claim 9, wherein said bistable storage means comprises a delay flip-flop, said delay means comprises a monostable multivibrator, and said logic means comprises a NAND gate.

11. The read circuit recited in claim 9, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

12. A read circuit for use in an information playback system comprising a read head for reading information from a storage medium and generating an alternating current playback signal having positive peaks, negative peaks, and false peaks, a differentiator for differentiating said playback signal and generating a differentiated signal having positive and negative polarity, and a comparator for generating an intermediate signal having a first level when said differentiated signal has a positive polarity and having a second level when said differentiated signal has a negative polarity, said read circuit generating an output signal having transitions corresponding to said positive and negative peaks only of said playback signal, said read circuit comprising:

bistable storage means responsive to said intermediate signal and to said output signal, said bistable storage means changing state for each of said transitions in said output signal, comparing means responsive to said intermediate signal and to the contents of said bistable storage means for generating a comparison signal when the level of said intermediate signal is in a predetermined relationship to the state of said bistable storage means, said comparison signal having a first time duration corresponding to the generation of a positive or negative peak by said read head and having a second time duration corresponding to the generation of a false peak by said read head, delay means responsive to said comparison signal for generating a delay signal a predetermined time after receipt of said comparison signal, the duration of said predetermined time being less than said first time duration of said comparison signal and greater than said second time duration of said comparison signal, and logic means responsive to the simultaneous occurrence of said delay signal and said comparison signal of first time duration for generating one of said transitions in said output signal, whereby transitions in said output signal are not generated according to said false peaks.

13. The read circuit recited in claim 12, wherein said bistable storage means comprises a delay flip-flop, said delay means comprises a monostable multivibrator, and said logic means comprises a NAND gate.

14. The read circuit recited in claim 12, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

15. In a read circuit for use in an information playback system comprising a read head for reading information from a storage medium and generating an alternating current playback signal having positive peaks, negative peaks, and false peaks, a differentiator for differentiating said playback signal and generating a differentiated signal having positive and negative polarity, and a comparator for generating an intermediate signal having a first level when said differentiated signal has a positive polarity and having a second level when said differentiated signal has a negative polarity, said read circuit generating an output signal having transitions corresponding to said positive and negative peaks only of said playback signal, the improvement in said read circuit comprising:

bistable storage means responsive to said intermediate signal and to said output signal, said bistable storage means changing state for each of said transitions in said output signal, comparing means responsive to said intermediate signal and to the contents of said bistable storage means for generating a comparison signal when the level of said intermediate signal is in a predetermined relationship to the state of said bistable storage means, said comparison signal having a first time duration corresponding to the generation of a positive or negative peak by said read head and having a second time duration corresponding to the generation of a false peak by said read head, delay means responsive to said comparison signal for generating a delay signal a predetermined time after receipt of said comparison signal, the duration of said predetermined time being less than said first time duration of said comparison signal and greater than said second time duration of said comparison signal, and logic means responsive to the simultaneous occurrence of said delay signal and said comparison signal of first time duration for generating one of said transitions in said output signal, whereby transitions in said output signal are not generated corresponding to said false peaks.

16. The read circuit recited in claim 15, wherein said bistable storage means comprises a delay flip-flop, said delay means comprises a monostable multivibrator, and said logic means comprises a NAND gate.

17. The read circuit recited in claim 15, wherein the operation of said read circuit is identical with respect to the generation of each of said transitions in said output signal, whereby transitions corresponding to said positive peaks are affected by circuit operational parameters including propagation delays in said read circuit to the same extent as transitions corresponding to said negative peaks.

18. In a read circuit for use in an information playback system comprising a read head for reading information from a storage medium and generating an alternating current playback signal having positive peaks, negative peaks, and false peaks, a differentiator for differentiating said playback signal and generating a differentiated signal having positive and negative polarity, and means for generating an intermediate signal having a first level when said differentiated signal has a positive polarity and having a second level when said differentiated signal has a negative polarity, said read circuit generating an output signal having transitions corresponding to said positive and negative peaks only of said playback signal, the improvement in said read circuit comprising:

logic means responsive to said intermediate signal and to said output signal for generating said transitions in said output signal, the operation of said logic means being identical with respect to the generation of each of said transitions in said output signal, whereby transitions corresponding to said positive peaks are affected by circuit operational parameters including propagation delays in said logic means to the same extent as transitions corresponding to said negative peaks.

* * * * *